US011727480B2

(12) United States Patent
Ohnemus et al.

(10) Patent No.: US 11,727,480 B2
(45) Date of Patent: Aug. 15, 2023

(54) SYSTEM AND METHOD FOR GRAPHICAL DISPLAY OF MULTIVARIATE DATA

(71) Applicant: Refinitiv US Organization LLC, New York, NY (US)

(72) Inventors: Peter Ohnemus, Herrliberg (CH); Henrik Steffensen, Walchwil (CH); David Leason, Chappaqua, NY (US); Dominique Habegger, Zurich (CH)

(73) Assignee: Refinitiv US Organization LLC, New York, NY (US)

( * ) Notice: Subject to any disclaimer, the term of this patent is extended or adjusted under 35 U.S.C. 154(b) by 399 days.

(21) Appl. No.: 16/532,416

(22) Filed: Aug. 5, 2019

(65) Prior Publication Data

US 2020/0034921 A1   Jan. 30, 2020

Related U.S. Application Data

(63) Continuation of application No. 11/071,978, filed on Mar. 3, 2005, now Pat. No. 10,417,700.

(51) Int. Cl.
*G06Q 40/00* (2023.01)
*G06Q 10/0639* (2023.01)
(Continued)

(52) U.S. Cl.
CPC ....... *G06Q 40/00* (2013.01); *G06Q 10/06393* (2013.01); *G06T 11/20* (2013.01); *G06T 11/206* (2013.01); *G06T 15/20* (2013.01)

(58) Field of Classification Search
USPC ............ 705/1.1, 35, 36, 7.38; 345/419, 440; 715/848; 707/5
See application file for complete search history.

(56) References Cited

U.S. PATENT DOCUMENTS

| 5,630,034 A | 5/1997 | Oikawa et al. |
| 5,675,745 A | 10/1997 | Marshall |

(Continued)

FOREIGN PATENT DOCUMENTS

| AU | 2002301158 | 6/2003 | |
| GB | 2192063 A | * 12/1987 | ............. G01B 3/004 |

(Continued)

OTHER PUBLICATIONS

International Search Report and Written Opinion of the International Searching Authority for PCT/US06/07720 dated Jun. 19, 2008 (17 sheets).

(Continued)

*Primary Examiner* — Lynda Jasmin
*Assistant Examiner* — Kimberly L Evans
(74) *Attorney, Agent, or Firm* — Norton Rose Fulbright US LLP

(57) ABSTRACT

Multivariate graphs specific to a company's performance, alone or in relation to a benchmark, and methods for producing same include defining on a display screen an origin having a first value, extending from the origin at least three axes on the display screen, the axes being generally equidistant from each other and representing a respective variable, plotting on the display screen a value of each variable concerning the company as a point on a respective axis, and using the plotted points to interpolate first segments between the axes on the display screen. Benchmark information, extrinsic to the company, can be obtained, processed into a rating in the same manner as the company data, and superimposed for ready visual comparison of the company's performance to the obtained benchmark. The benchmark information, if shown, is distinguished from the company's performance graph.

14 Claims, 12 Drawing Sheets

(51) Int. Cl.
*G06T 15/20* (2011.01)
*G06T 11/20* (2006.01)

(56) References Cited

U.S. PATENT DOCUMENTS

| | | | |
|---|---|---|---|
| 5,761,442 A | 6/1998 | Barr et al. | |
| 5,774,121 A | 6/1998 | Stiegler | |
| 5,870,319 A | 2/1999 | Thornton et al. | |
| 6,012,044 A | 1/2000 | Maggloncalda et al. | |
| 6,295,513 B1 | 9/2001 | Thackston et al. | |
| 6,373,483 B1* | 4/2002 | Becker | G06T 11/206 345/419 |
| 6,772,146 B2 | 8/2004 | Khemlani et al. | |
| 7,215,430 B2* | 5/2007 | Kacyra | G01S 17/89 356/601 |
| 7,277,864 B2 | 10/2007 | Ohnemus et al. | |
| 2002/0013720 A1* | 1/2002 | Ozono | G06Q 40/00 705/35 |
| 2002/0091613 A1 | 7/2002 | Kendall et al. | |
| 2002/0161764 A1 | 10/2002 | Sharo | |
| 2003/0014344 A1 | 1/2003 | Chacko et al. | |
| 2003/0018487 A1 | 1/2003 | Young et al. | |
| 2003/0028527 A1 | 2/2003 | Crosby et al. | |
| 2003/0046203 A1 | 3/2003 | Ichihari et al. | |
| 2003/0088492 A1* | 5/2003 | Damschroder | G06Q 40/06 705/36 R |
| 2003/0110065 A1 | 6/2003 | Twigge-Molecey | |
| 2003/0126054 A1* | 7/2003 | Purcell, Jr. | G06Q 40/06 705/36 R |
| 2003/0182220 A1* | 9/2003 | Galant | G06Q 40/00 705/36 R |
| 2003/0195884 A1 | 10/2003 | Boyd et al. | |
| 2003/0225652 A1 | 12/2003 | Minow et al. | |
| 2004/0064394 A1 | 4/2004 | Wallman | |
| 2004/0117240 A1 | 6/2004 | Ness et al. | |
| 2004/0117283 A1 | 6/2004 | Germack | |
| 2004/0183800 A1* | 9/2004 | Peterson | G06T 11/206 345/440 |
| 2004/0220868 A1 | 11/2004 | Dainoff et al. | |
| 2004/0236658 A1* | 11/2004 | Bowman | G06Q 40/06 705/36 R |
| 2004/0246252 A1 | 12/2004 | Morrow et al. | |
| 2004/0249697 A1* | 12/2004 | Ohnemus | G06Q 40/02 705/7.32 |
| 2005/0021389 A1 | 1/2005 | Dias et al. | |
| 2005/0021390 A1 | 1/2005 | Porter et al. | |
| 2005/0075875 A1 | 4/2005 | Shozakai et al. | |
| 2005/0168461 A1 | 8/2005 | Acosta et al. | |
| 2005/0209905 A2 | 9/2005 | Ness et al. | |
| 2005/0209948 A1 | 9/2005 | Ballow et al. | |
| 2005/0288892 A1 | 12/2005 | Martini | |
| 2006/0015425 A1 | 1/2006 | Brooks | |
| 2006/0200358 A1 | 9/2006 | Ohnemus et al. | |
| 2006/0200375 A1 | 9/2006 | Ohnemus et al. | |
| 2006/0200459 A1* | 9/2006 | Ohnemus | G06Q 30/02 707/5 |
| 2007/0005477 A1* | 1/2007 | McAtamney | G06Q 40/00 705/35 |
| 2008/0059457 A1 | 3/2008 | Ohnemus et al. | |
| 2008/0086387 A1 | 4/2008 | O'Rourke et al. | |
| 2008/0109472 A1 | 5/2008 | Underwood et al. | |
| 2011/0057928 A1* | 3/2011 | Hasegawa | G06Q 10/087 345/419 |
| 2011/0261049 A1* | 10/2011 | Cardno | G06Q 40/04 345/419 |
| 2015/0310648 A1* | 10/2015 | Matange | G06Q 10/00 345/440 |

FOREIGN PATENT DOCUMENTS

| | | | | |
|---|---|---|---|---|
| JP | 2003515211 A | * | 4/2003 | G06T 11/20 |
| JP | 2004302501 A | * | 10/2004 | |

OTHER PUBLICATIONS

O'Connor, "The RioJo Dashboard of Sustainable Development Indicators," Jul. 2002, [Google].

Hallerbach, et al., 2004. "A Framework for Managing a Portfolio of Socially Responsible Investments." European Journal of Operational Research, 153:517-519.

CGSDI's Dashboard of Sustainability, archived at http://web.archive.org/web/*/http://esl.jrg.it/envind/dashbrds.html, archived between Mar. 10, 2001 and Feb. 13, 2003.

"Nedbank Launches Sustainable Investment Index Fund," SAPA (South African Press Association), Aug. 7, 2002.

* cited by examiner

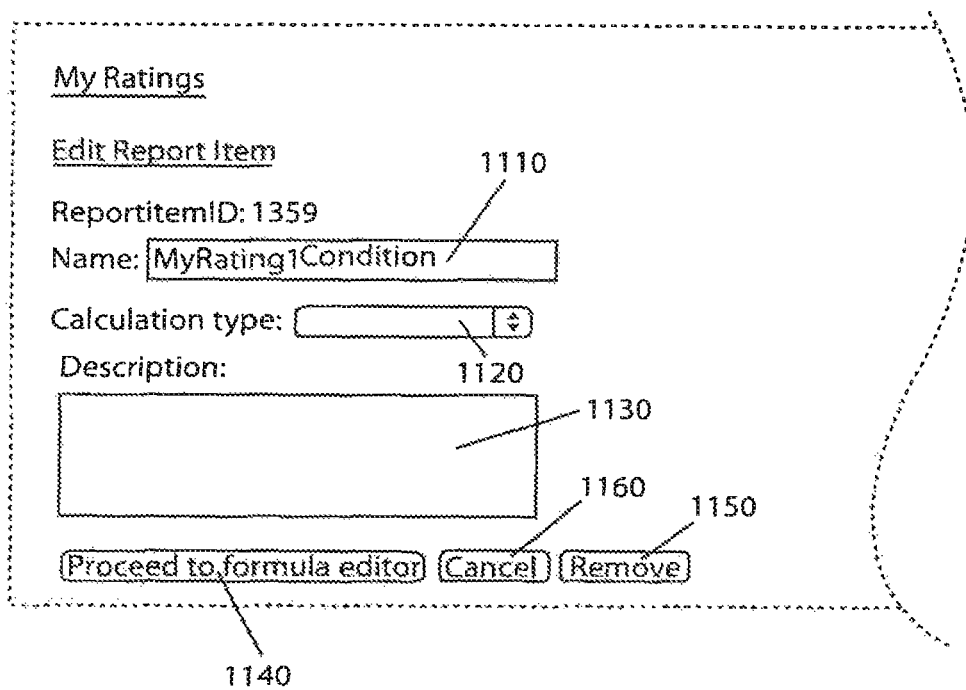

Alert settings for Enviromental
- ☐ Grade changes
- ☐ Grade increases
- ☐ Grade decreases
- ☐ Trigger Level    Max: [____]
                     Min: [____]

- ☐ Rating changes
- ☐ Rating increases
- ☐ Rating decreases

- ☐ Email  [____]
- ☐ SMS    [____]

- ☐ My Alerts List ( Save )   ( Canel )

Fig. 14

Company name: 3M Co.
Sector: INDUSTRIALS
Industry: INDUSTRIAL CONGOLERATES
Base Country: US Corporate Web | Stock Infor Period: 2004 | Print to... | Add to | Set Alert Raw Data —— 1410
Main Indicator: EN21

Information Source: —— 1420
URL: http://www.3M.com/..............

Textual Data: —— 1430
We do not believe that this indicator ia apporpriate for asseccing our impacts Comment:
None Binary files:
None Data Status:
Unknown Information Quality:
Unknown

SYSTEM AND METHOD FOR GRAPHICAL DISPLAY OF MULTIVARIATE DATA

CROSS-REFERENCE TO RELATED APPLICATIONS

The present application is a continuation of U.S. patent application Ser. No. 11/071,978 filed Mar. 3, 2005 and entitled "SYSTEM AND METHOD FOR GRAPHICAL DISPLAY OF MULTIVARIATE DATA," the disclosure of which is incorporated herein by reference in its entirety.

FIELD OF THE INVENTION

The present invention concerns the rating, benchmarking, manipulation and presentation of extra financial information (e.g. economic plus environmental, social, and corporate governance (EESG) data) and more particularly relates to a configurable user interface for presenting complex, multivariate data of a company and for a company in relation to its sector, industry or other benchmark(s) and permitting exploration and access to the EESG performance of a company.

BACKGROUND OF THE INVENTION

The business world more than ever is demanding a higher level of transparency in its statements and reports to the investing public, their executive management and board members and to the asset management industry. In part, this is due to the debacles caused by corporate scandals of major enterprises such as Enron, Worldcom, Parmalat and others in which investors and pension funds participants lost billions of dollars. Legislation has been passed in many countries to mandate guidelines for corporate governance and accounting. A notable example in the United States is the passage of the Sarbanes Oxley Act.

The world has become an instant global village where everybody knows everything—and nothing. According to Morgan Stanley (January 2005), there are now more than 850 million people participating twenty-four hours a day, seven days a week in the Internet economy. Also, the number of mobile phones in use has increased to more than 1.6 billion users worldwide. Of these mobile phones, more than 20% are said to be real-time instant Internet devices. Microsoft and its competitors report that they have more than 350 million instant message users signed up to their Instant Message platforms. Due to the rate of information transfer, companies are pressed to provide a more detailed level of transparency and "good behavior." Value takes years to generate in the corporate world but can be destroyed within hours.

Many companies make use of their corporate websites to provide information to investors, analysts and the press. Based on the information provided, the performance of a company can be "benchmarked" relative to their peers. However, benchmarking in this manner is subjective, subject to human bias and is therefore cannot be applied across many companies in a precise manner. Neither are tools available for ready, objective benchmarking using prescribed or user-established criteria. Over the past eight years or so, the Swedish company Hallvarsson & Hallvarsson has measured the public performance of the Internet appearance for Europe's top 150 listed companies and the clear indication from their data is that above-average share performance is directly linked to good corporate behavior and true information sharing.

It would be an improvement in the field to provide board members and executive management teams with an integrated view of companies of interest. Both from a legal perspective and from a public point of view, companies are under pressure to provide trust, transparency and right decision making. The classic reliance on short term and mostly static economic (financial) data is insufficient.

What is needed is more than a company centric view. Within the asset management industry it is acknowledged that about 30% of a company's value is based on financial data and 70% is based on soft data. The present invention addresses these and other needs.

SUMMARY OF THE INVENTION

In accordance with one aspect of the invention, a method provides tiered-access to rating data for users at respective client machines who are connected to a distributed computer network. In this method, an integrated rating for a company is computed by applying a formula to plural discrete indicators concerning a particular company. The indicators can be contained in a database and among them there is a first portion which relate to financial data and a second portion which relate to non-financial data. Users at their respective client machines are presented with a name of the particular company in association with the computed integrated rating through a first interface component that is accessible through the distributed computer network. A subset of the users is selectively permitted to interact with prescribed indicators from which the integrated rating is derived.

In a related yet further aspect of the invention, a system for rating an entity is publicly accessible by users at respective client machines through respective connections to a distributed computer network. At least part of the rating system executes on a host machine with reference to indicators in a database. The system includes a first interface component, such as a query-result component (Q-result), which is accessible through the distributed computer network. The first interface component is configured to present to the client machine at least one company name in association with a respective integrated rating. A processor is configured by software to compute each respective integrated rating as a single rating value which is derived by application of a first formula to prescribed ones of plural discrete indicators contained in the database. As noted above, a first portion of the discrete indicators relates to financial data whereas a second portion of the discrete indicators relates to non-financial data. A second interface component (such as an authentication-interface component) is configured to permit only selected users to interact with the prescribed indicators from which the single rating value is derived.

In more particular aspects, the inventive rating system can include a software module at the host machine as the second interface component which is configured to test any cookie passed from the client machine upon connection to the host machine. As well, the inventive rating system can include a software module at the host machine configured to process user identification information received from the client machine and to include among the selected users any user whose received identification information satisfies at least one prescribed criterion.

In further particular aspects, the inventive rating system can include a third interface component which is responsive to any permission established by the second interface component. The third interface component can enable a variety of interactions with the prescribed indicators from which the single rating value is derived, including by way of examples: permitting the selected users to inspect a value of one or more of the prescribed indicators; permitting the selected users to export a value of one or more of the prescribed indicators; permitting each respective selected user to receive an alert concerning a change in a value of one or more of the prescribed indicators; permitting the selected users to alter a value of one or more of the prescribed indicators; receiving from any selected user a second formula different from the first formula, wherein the processor uses the second formula in computing the single value in lieu of the first formula; and receiving from any selected user at least one benchmark criterion for coordination with the presentation of the integrated rating of a company.

In accordance with yet another aspect of the invention, a method for multivariate presentation of variables concerning a company's performance includes defining on a display screen an origin having a first value, extending from the origin at least three axes on the display screen, the axes being generally equidistant from each other and representing a respective variable, plotting on the display screen a value of each variable concerning the company as a point on a respective axis, and using the plotted points to interpolate first segments between the axes on the display screen.

In more particular aspects of this method for visually presenting a company's performance the first segments can extend to the axes and connect to one another to define polygonal or curved shapes. Also, benchmark information which is extrinsic to the company can be obtained and plotted on the display screen together with the company's performance for ready visual comparison of the company's performance to the obtained benchmark.

In a related aspect, a multivariate graph of variables concerning a company's performance comprises an origin having a first value, at least three axes extending from the origin, the axes being generally equidistant from each other and representing a respective variable concerning the company, a point plotted on each axis corresponding to a value of the respective variables, and a first segment extending between each axis so as to interpolate the plotted points, wherein the origin, axes, plotted points and the first segments are displayed on a display screen. As noted above, benchmark information which is extrinsic to the company can be plotted together with the company in way that the benchmark information is distinguishable from the first segments of the company's performance graph.

In still a further aspect of the invention, an interface to a ratings system that permits a user to zoom in and out to different levels of detail comprises an interactive presentation of a rating value of a company at a first displayable location in the interface, a first button responsive to interaction with the first displayable location, and a hierarchy of parameters associated with the rating value, at least a first parameter in the hierarchy of parameters being selectively displayable in association with the rating value upon interaction with the first button to present in the interface data underlying the rating value of the company. The zoom interface can navigate the user to the prescribed indicators from which an integrated rating is derived, present at differing depths in a hierarchy of indicators the multivariate relationships among the variables, and permit interaction with the prescribed indicators as noted above.

In yet still further aspects of the invention, users can be alerted of any changes in the integrated rating value or in the value of any selected indicators. Each alert can comprise electronic message sent to a user address, and can be conditioned upon satisfying a threshold-change in value.

These and other features, aspects and advantages of the invention can be appreciated from the following Description of Certain Embodiments of the Invention and the accompanying Drawing Figures.

As used herein, "button" refers to a control that can be actuated by a user through the interface such as by a single click of a mouse button, hovering over an active region on the display, or by pressing a particular key or combination of keys on a keyboard.

Within the meaning of plotting a point "on the axis" is the visual presentation of indicia "adjacent to" the axis so long as the user perceives the value of the variable in relation to the axis.

BRIEF DESCRIPTION OF THE DRAWING FIGURES

FIG. 11 illustrates details for editing a particular, existing My Rating.

FIG. 12 illustrates a selection of My Alerts presentable in an interface constructed in accordance with an embodiment of the invention to permit users to alter personal alerts.

FIG. 14 illustrates a raw data underlying a particular integrated rating.

DESCRIPTION OF CERTAIN EMBODIMENTS OF THE INVENTION

By way of overview and introduction, the present invention provides a configurable user interface to a ratings system which presents integrated ratings of financial and non-financial information regarding companies of interest. The integrated ratings are calculated using data and formulae that the user can inspect. The methodology, framework and interface presents an advance in the art by enabling users to explore complex, multivariate data of a company, optionally in relation to the company's sector, industry or in relation to other benchmark(s). A company's economic, environmental, social, and corporate governance performance, as well as statistics relating to one or more of these four "pillars," can be objectively analyzed. In addition, the user can alter or filter the underlying data and formulae to arrive at ratings that take into account the user's preferences, perceptions, or hypotheticals.

The illustrated embodiment is described in connection with a ratings system that is hosted by a host machine (e.g., a web server) and publicly accessible to users at respective client machines through a connection to a distributed computer network; however, the invention is not so limited in application. The executables that comprise the rating system can run on a stand-alone system and can be provided in a transportable format for local installation by a user, e.g., as a CD-ROM or in some other high-density storage medium. Likewise, the database can be maintained locally, and the local copy can include information on any companies, sectors or industries that are of interest to a particular user codified as "indicators" and arranged in a hierarchical structure within the database. At least one processor is configured by software to access the database and compute ratings by applying prescribed ones of plural, discrete indicator values to at least a first ratings formula. This results in at least an integrated rating having a single value. This arrangement is particularly amenable to a pay-as-you go model in which users are charged for each company that they wish to inspect, though that same model can be used in a remote, hosted embodiment. The ratings system, regardless of where it resides, preferably is in communication with an update software module that provides or can obtain electronically current information on the companies being watched, and current, pertinent benchmark information, and news alerts, if desired.

Figure 1:
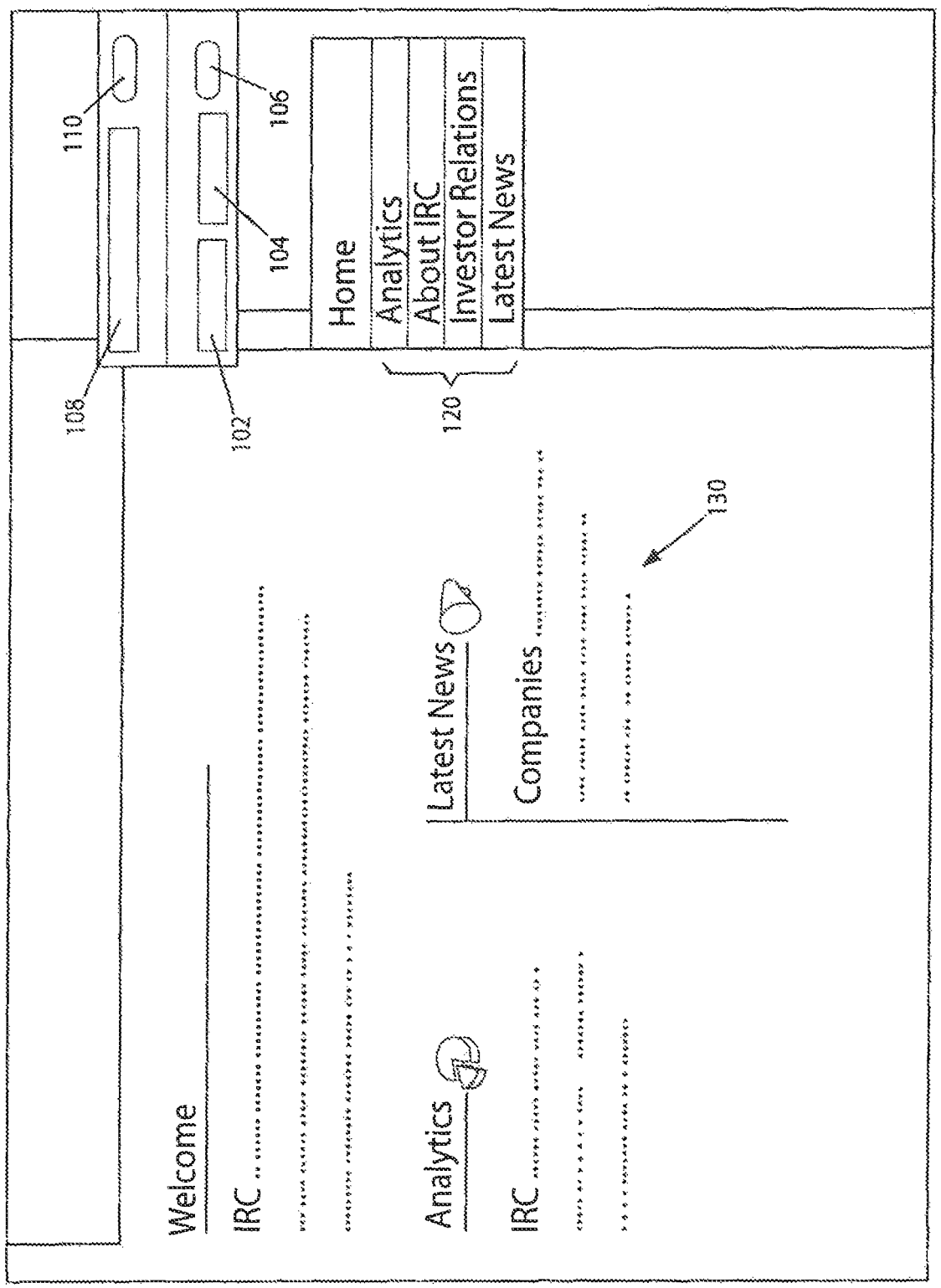
FIG. 1 illustrates an exemplary home or start page in a user interface constructed in accordance with an embodiment of the invention.

Referring now to FIG. 1, users of an interface constructed in accordance with an embodiment of the invention can be presented with an authentication-interface component on a page 100 which permits the visitor to login can comprise suitable boxes for entering an account identifier 102 and a password 104 and then pressing a submit button 106. Alternatively or in addition (that is, for subsequent connections from a particular registered-user's client machine), the authentication-interface component can include a software module that tests a cookie passed from the client machine upon connection to the host. Cookie technology is well understood in the art and is not described herein. This interface component sets or establishes users as "registered" users once they or their machines have satisfied at least one prescribed criterion. The "registered" status of a user enables the software of the rating system to control access through the interface by permitting only selected users to interact with indicators in the manner described hereinbelow in connection with FIGS. 3-14. For visitors that do not have accounts, further buttons can be provided on the page 100 to initiate a new-user registration. A query-interface component can comprise a search-query text box 108 for entering a search query and a search submit button 110. This interface component can be provided on the page 100 that permits visitors to enter searches and receive limited information in response. Preferably, registered users have access to more information and reports than do visitors because their identification information has been processed by the authentication-interface component software. The page 100 preferably is a home page served from a host server that manages the rating systems to multiple, geographically distributed, compliant client machines used by respective users. More preferably, page 100 is a web page constructed using HTML and/or DHTML, and optionally includes active elements such as ActiveX controls or Applets to provide a rich and dynamic presentation of ratings and relevant information and to include at least a portion of the executable code of the rating system as code resident for execution at the client machine. The page 100 preferably includes links 120 to direct users to further web pages that convey information to the user such as: the analytics and variables utilized in rating companies; information about the host provider (herein, referred to as the "Independent Rating Company" or "IRC"); investor relations information; and pertinent news articles. The remainder of the page can include text and graphics 130 that inform the user of the capabilities or features of the ratings system.

Figure 2:
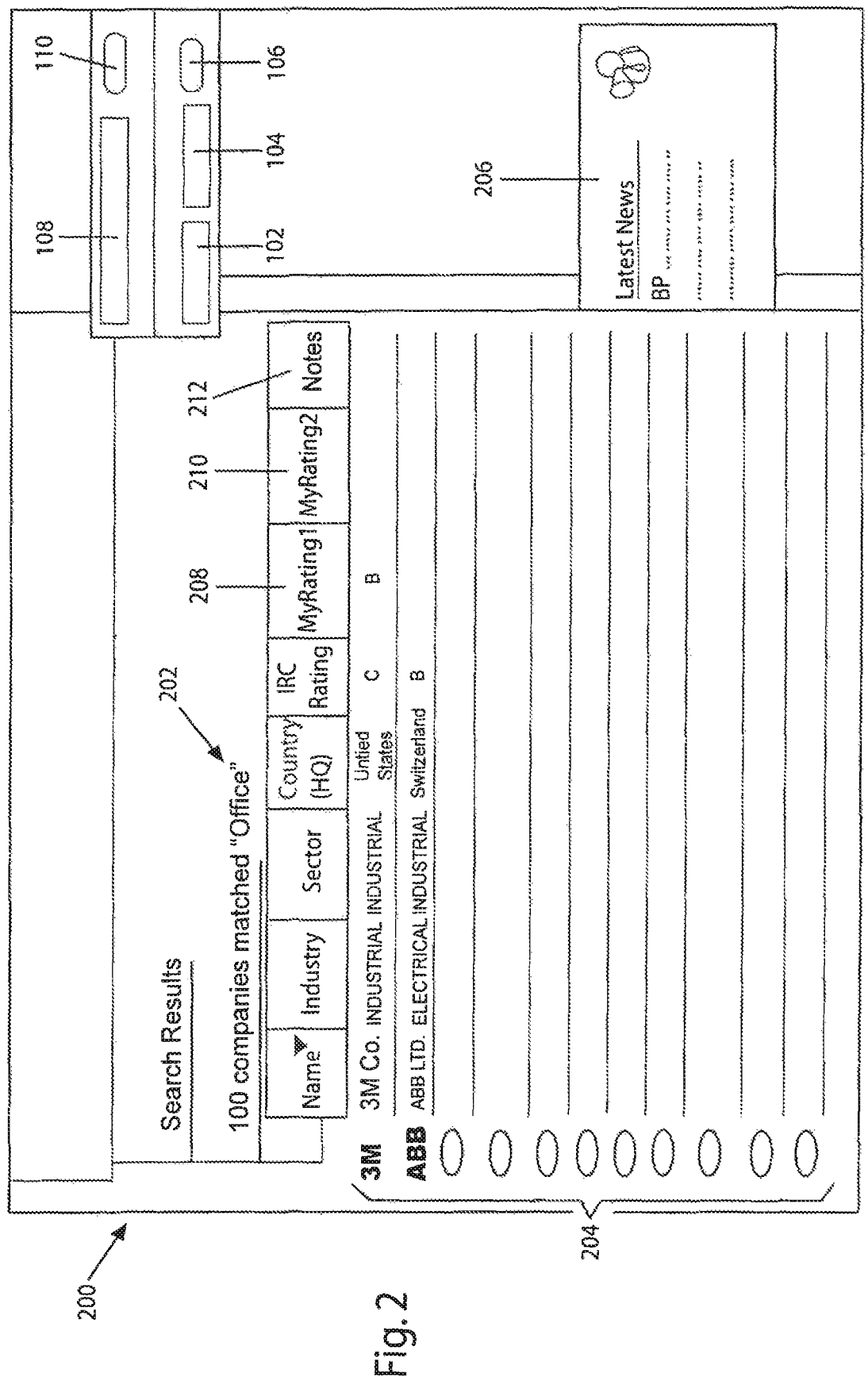
FIG. 2 illustrates an exemplary search results page in a user interface constructed in accordance with an embodiment of the invention.
Figure 3:
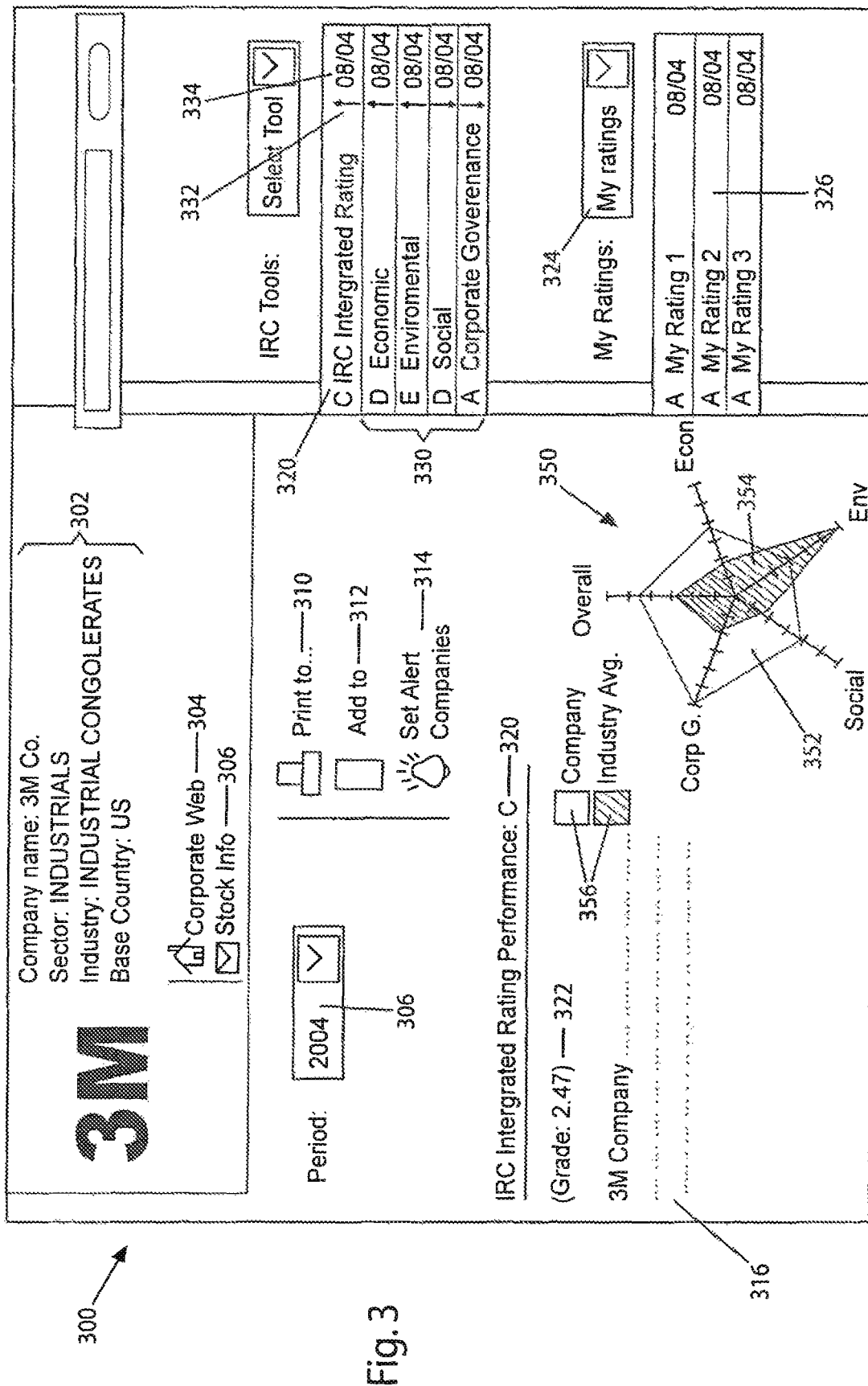
FIG. 3 illustrates an exemplary rated-company page in a user interface constructed in accordance with an embodiment of the invention.

In the event that a user enters a search query in text box 108, search results are provided at the client machine by a Q-results interface component in a search results page 200 as shown in FIG. 2. For all users, whether registered with the host provider or not, searches can be permitted that present integrated ratings for companies that satisfy the search criteria. For example, the search query "office" may result in one-hundred matching companies including, among others, "3M" and "ABB." The search query is presented in title line 202 and the results including the integrated rating for each company in association with the company name are displayed in an organized arrangement, such as shown in table 204. For example, the company names and ratings can be associated in the same row of the table 204. A preview pane 206 can be provided to provide an abbreviated story or headline on a recent news item. The preview pane can be configured as a pop-up alert or dialog box which the user can select or close, and which can close automatically if not selected within a period of time. Visitors, and more preferably registered users, can be permitted to select (e.g., click) the preview pane and be directed to the complete story.

Preferably, only registered users are able to explore the search results in table 204 beyond what is presented in page 200, e.g., to review the four pillars that comprise the integrated rating or the indicators that underlie the pillars. Thus, visitors can be presented with an integrated rating expressed as a single rating value in an alphabetic format. Also, preferably, only registered are permitted to establish their own ratings (MyRating1 208, MyRating2 210, etc.) and enter and record notes 212. A detailed discussion of customized ratings that are displayable through the present interface is provided in U.S. patent application Ser. No. 10/708,441, filed Mar. 3, 2004, entitled "Sustainability Ratings For Legal Entities," and in particular in connection with FIGS. 13A through 13F, which application is hereby incorporated by reference as if set forth in its entirety herein. Briefly, registered users can alter coefficient values and/or weightings ascribed to the indicators that are utilized in arriving at the single value rating, and these altered values/weightings are then used by a now different ratings formula to compute customized ratings, including integrated ratings, component ratings in each of the four pillars of economic, environmental, social, and corporate governance, as well as with regard to categories that concern those pillars. The customized ratings result from a formula that differs from the rating system formula in the value or weighting (collectively referred to as "value") of at least one coefficient and this "different" formula can be applied in lieu of the rating system formula that is utilized in computing single rating values for non-registered visitors. Each user can compute a personalized score that expresses his or her own ideology or institutional preference/perspective, and these customizations can be saved under one or more "MyRatings" tabs.

For those selected users who are permitted to inspect the data behind the integrated rating, a rated-company page 300 can be served to the client machine in a number of ways, including by selecting an entry in the table 204 or by selecting an entry in a My Companies list 910, as described below in connection with FIG. 9. A variety of features are available to the registered users that enable various interactions between the user and the indicators from which the single rating value is derived. In the following discussion, the interface component software permits interaction based on the status of the user as "registered," and as such the features described in connection with FIGS. 3-14 are responsive to permissions established by the authentication component.

The rated-company page 300 provides certain basic information 302 about the company being rated including its name, sector, industry, and base country in which it has its headquarters of operation. (The sector and industry that a particular company belongs to can be determined from the Global Industry Classification Standard ("GICS") code for that company.) This basic information 302 is provided in the first four columns of table 204 to all visitors. There are also links to a corporate web site 304 and to stock information 306 concerning the company. The rating for a company displayed on page 300 (in this case, "3M") is for a specific period, and as can be appreciated, a company's rating can vary depending on the window of time under analysis. A user can select a period for analysis using pull-down list 308, and the ratings for the company are refreshed to coincide with the selected time period. The user has other options available for selection, such as to send the present page to a printer (button 310), to add the company to the My Companies list (button 312), and to set alerts for this company (button 314). The rated-company page also includes a general description 316 of the company and its industry.

The rated-company page 300 includes an integrated rating of the company's extra-financial performance, which is expressed and displayed both as a letter grade 320 and also as a numeric grade or scale 322. The integrated rating is computed by the rating system on the basis of inspectable coefficients and weightings that are applied to the underlying data. Integrated ratings based on other settings established by registered users can be presented under the My Ratings tab 324, such as in the My Ratings table 326 which shows a higher performance rating ("A") as compared to that computed by the rating system ("C"), as shown at 320.

The integrated rating 320 is preferably computed from individual ratings in four principal areas of corporate endeavor, namely, economic (which includes conventional financial data such as earnings per share, revenue, profit/loss, as well as more long term oriented qualitative information such as brands, consumer complaints, accounting practices, etc.), environmental (which includes emission levels, regulatory compliance, etc.), social (which includes workforce issues such as labor, gender and non-discriminatory corporate practices, etc.), and corporate governance (which includes board composition, written policies, management, etc.). These so-called "pillars" are preferably computed as component ratings and are thereafter combined in a prescribed manner (as described in the aforementioned co-pending application which has been incorporated by reference) to define the integrated rating. In the rated-company page 300, the pillars each have a letter grade 330, and any change 332 upward or downward in that component's rating and the date 334 of such change are preferably shown.

Figure 4:
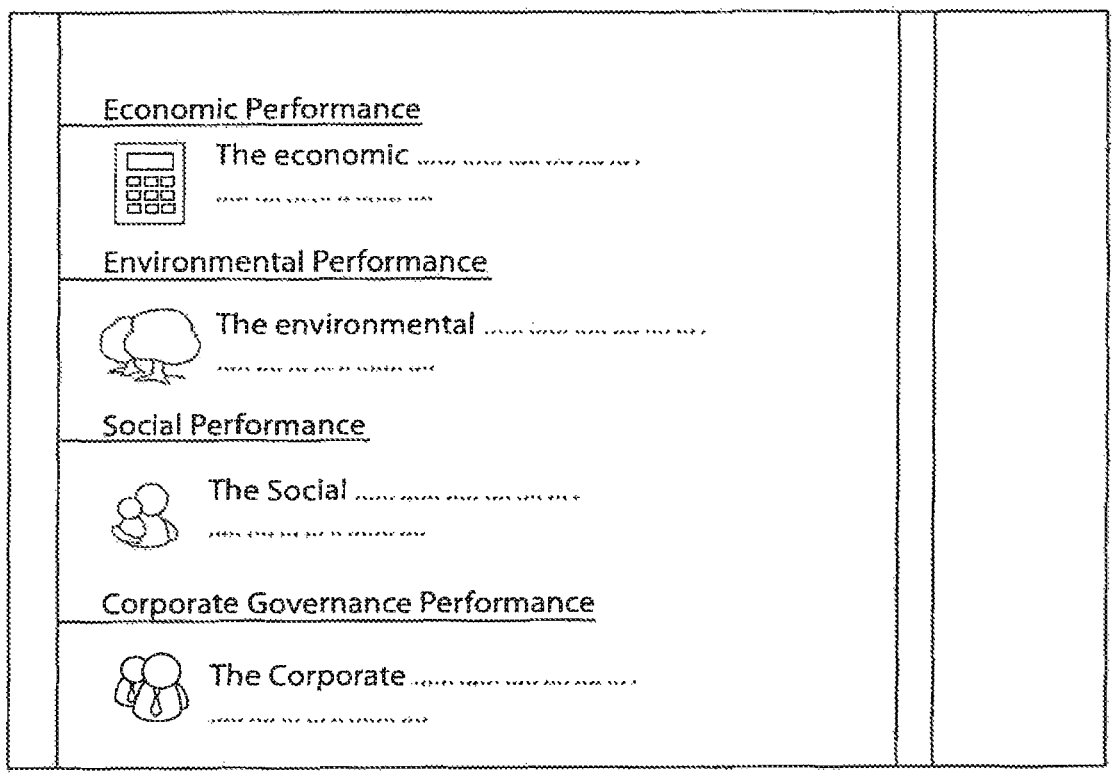
FIG. 4 illustrates further information that can be included on the page of FIG. 3.

The significance of each pillar can be explained on the rated-company page 300 or on a separate page. FIG. 4 illustrates further, optional information that can be displayed to the user to explain the pillars. Briefly, the Economic Performance rating concerns a company's capacity to generate high returns on investments. The rating system utilizes indicators that focus on long term revenue growth and margin improvements through tangible and intangible elements that do not systematically appear in financial statements. This pillar includes financial data and no non-financial data whereas the remaining pillars concern non-financial data, optionally in combination with financial data. The Environmental Performance rating concerns a company's impact on living and non-living natural systems, including ecosystems, land, air and water. Certain environmental aspects are associated with a company's competitiveness and financial performance (e.g., level of $CO_2$ emission) and the rating system utilizes indicators that are relevant to these factors. The Social Performance rating concerns a company's impact on the social systems within which it operates. Social performance can be gauged through an analysis of the company's impact on stakeholders. The main stakeholders addressed in the social pillar are the workforce, the society as a whole and of course the customers, as reflected by the selected indicators used by the rating system. In some cases, social indicators influence the company's intangible assets, such as its human capital and reputation. The Corporate Governance Performance rating examines indicators relating to the systems and processes that a company has in place to ensure that a company's directors and manager act in the interests of a company, its shareholders, and other stakeholders, and to ensure the mechanisms are in place so as to hold managers accountable to investors for the use of assets. Each of the pillars is a variable composed of one or more categories of indicators that can be manipulated through weightings, coefficients or mathematics to influence their impact on the numerical grade 322 of the integrated rating. Likewise, each of the pillars and most of the variables used in the rating system comprises a calculation that is based upon values or settings of two or more underlying indicators whose values/settings can be inspected by the user.

In accordance with one aspect of the invention, the components that lead to the calculation of each pillar can be displayed by selecting a pillar from the page 300. This causes the hierarchy of parameters that comprise the value of each pillar to be displayed with each successive selection until the basic source of data for a given parameter has been displayed. In this way, a user can "drill down" and inspect the data underlying a rating, and can alter the value or weighted importance of a given indicator for display as a My Rating. For example, the user can select the Environmental Performance pillar 360 by clicking on that portion of the display and be presented with further details on the data underlying that rating, as discussed in connection with FIG. 5 below.

In accordance with another aspect of the invention, the integrated rating 320 and the four pillars 330 are displayed together in a multi-axis graph 350. The graph 350 has one axis for each of the four variables that comprise the pillars, and, preferably (as shown), an additional axis for the integrated rating which comprises a statistical parameter. In this example the statistical parameter is derived from each of the pillar-variables. The axes are preferably equidistantly spaced and extend from a common origin having a first value, which value can be defined to be zero if the rating values are on a scale that starts at zero. The numeric grade 322 of the integrated rating is plotted on the axis labeled "Overall," and the numeric grades that correspond to each of the pillars is plotted on a respective axis of the graph. Preferably, segments are plotted that interpolate between the plotted points on each of the axes. In one arrangement, linear segments connect the plotted points, as shown, to present the multiple variables being plotted as a polygon 352 representative of the company's EESG performance. In other arrangements, arcuate segments can extend between the plotted points or segments can be plotted on the graph and remain unconnected to the plotted points. With regard to the illustrative example of 3M, an "A" rating under corporate governance results in a point plotted far from the origin and causes an expansion and stretching of the visual polygon image 352. Within the meaning of plotting a point "on the axis" is the visual presentation of indicia "adjacent to" the axis so long as the user perceives the value of the variable in relation to the axis.

In accordance with a salient aspect of the invention, benchmark information is coordinated with the company rating to provide the user with insight as to the relative performance of the company. The benchmark information can concern a competitive company, a sector or an industry, but in any case the benchmark information is extrinsic to the company meaning that it is information that is not the same in many if not all respects to that which is used to rate the company. The rating system obtains the benchmark information from a database, for the relevant time period set in box 308, and preferably superimposes on the graph 350 the benchmark performance for each of the variables that is plotted for the company. Preferably, points are plotted for each of the variables (e.g., the overall and E, E, S, and G variables) in the graph 350, and the space between the axes is interpolated or interconnected to form a polygon (or closed-curved object) 354 in a manner that permits the company's performance to be readily distinguished and compared to that of the benchmark data by the user.

A legend 356 informs the user which color, tick-mark, lines, or shapes are associated with the company under analysis and which is associated with the benchmark. The benchmark can be compared with the company's performance in other ways, such as by way of bell curves; however, the graph 350 provides a two-dimensional visual representation of the comparative performance in each of the variables that are presently under inspection. Thus, at the integrated rating or top-level, the graph 350 shows comparative performance with respect to each of the four pillars and the overall rating, whereas at a lower-level, such as discussed in connection with FIG. 5 below, the comparative performance can visually represent particular variables that underlie the integrated rating.

A great number of benchmarking possibilities can be presented to the user for comparing the performance of a company against extrinsic information. A non-limiting set of possibilities includes a comparison to the universe of all or selected companies in the database, to all or select companies from a chosen country, to all companies from a chosen industry (even an industry different than the company's GICS classification), to a specific company or companies, to the best in the class of the company being inspected, to personal benchmark criteria, to other companies being tracked by the user in the user's My Companies list 910 (discussed below), in relation to one or more of the user's personalized My Ratings, and to combinations of these possibilities.

Figure 5:
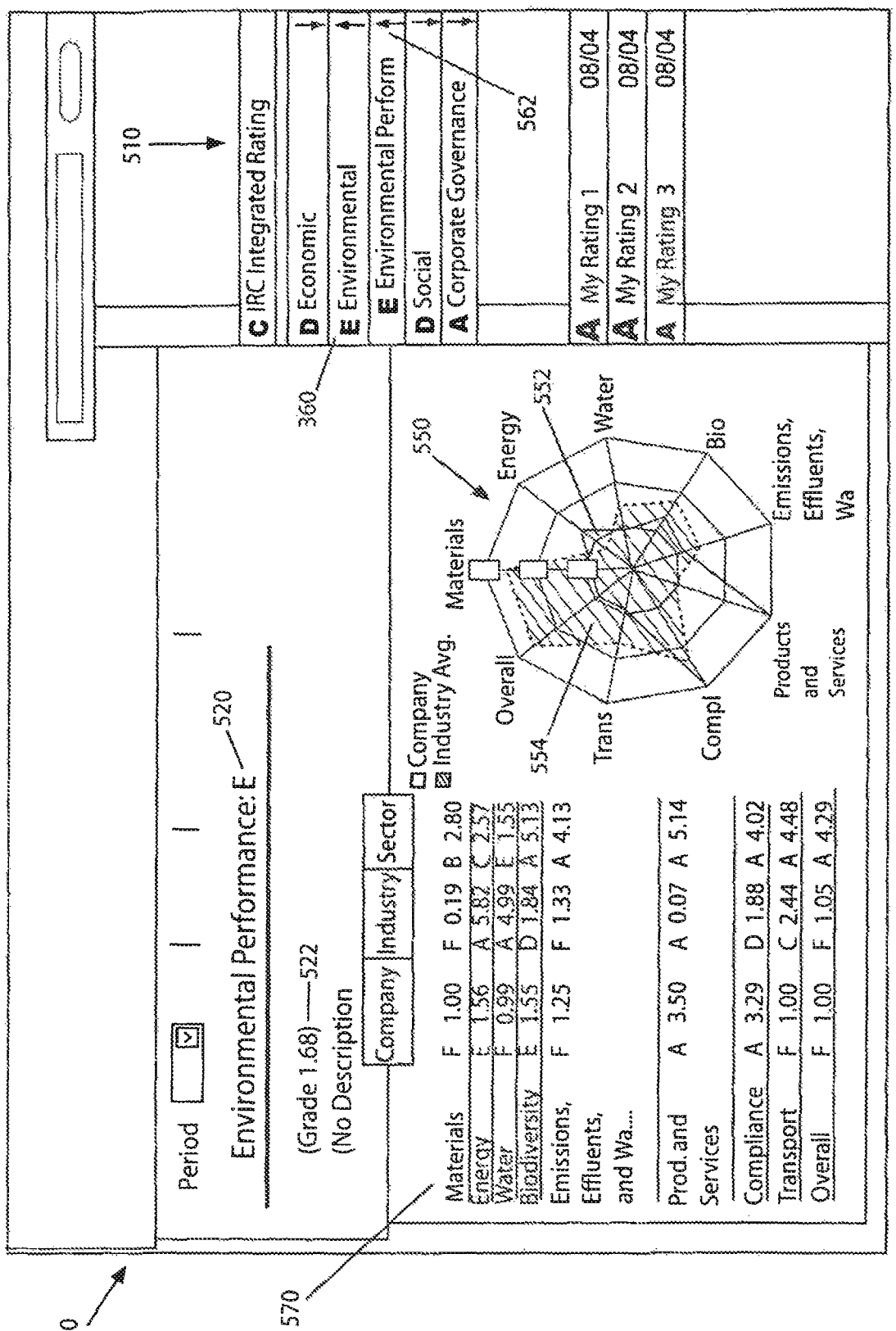
FIG. 5 illustrates an exemplary page in a user interface constructed in accordance with an embodiment of the invention showing certain parameters and their respective values that govern a rating that has been calculated for a component of the integrated rating in FIG. 3.

FIG. 5 illustrates a page 500 which includes further details concerning one of the pillars, including the variables that resulted in the Environmental rating "E." The page 500 can include other information such as the basic company information 302, etc., but has been abbreviated in order to focus on the additional features added by this page. In FIG. 5, details of the Environmental Performance are shown, for example, as a result of click-selecting pillar 360 from page 300. Preferably, the variables being inspected in the hierarchical list 510 are distinguished from higher-level variables, for example, by indenting the variables being displayed on the remainder of the page. The integrated rating 320 is at the top of the hierarchy, followed by the pillars, and then categories and downward to the basic indicators. Thus, Environmental Performance 562 is indented in the hierarchical list 510. The Environmental performance of the company is shown as a letter grade 520 in the title line and also as a numeric grade 522. The performance is also illustrated in a table 570 which shows the company's score in each of eight categories of information that is used in the grades 520, 522 (and hence integrated rating grades 320, 322). The table 570 further shows comparative performance of the company to the grades received in its industry and sector. The numerical grades set forth in the table are used as values in a graph 550 which plots the company's performance 552 in correlation with the industry average 554, as described above in connection with graph 350. In the graph 550, there are nine axes, one for each category being plotted as a variable, and another for an overall rating which is a statistic derived from the other variables. As noted above, a registered user can inspect and optionally alter the numerical values for any one or more of the categories/indicators or change their respective influence on the overall Environmental Performance calculation. For instance, if energy, water and transport parameters are not perceived as pertinent to a particular user, then the resulting rating for the company would compare substantially more favorably to the relevant industry in the illustrated example.

The user can be permitted to experiment with alterations to the quantified data for a given company to see how such changes affect the ratings, without disrupting the real data in the database used by all users. The user can get a "sandbox" version of a company, e.g. by clicking an icon on a report page. This action causes a copy all the quantified data from the company to the "sandbox," which the user can then play with by changing the data values. A sandbox company is user-specific and can only be seen and modified by the user who created it.

Figure 6:
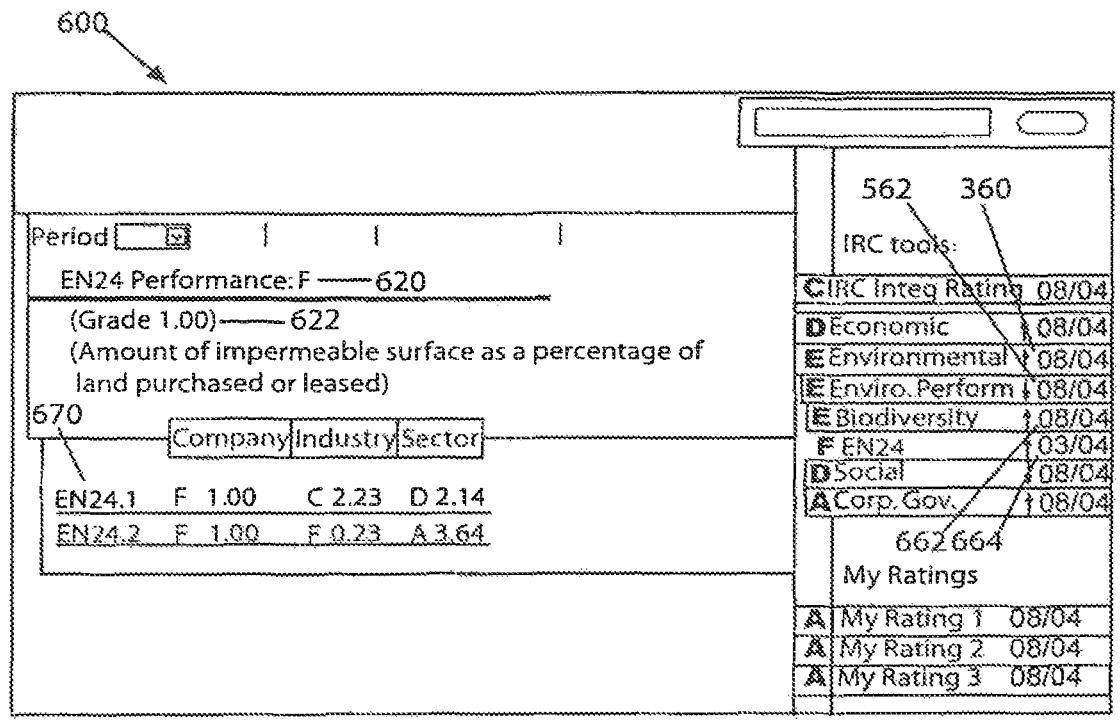
FIG. 6 illustrates an exemplary further page in a user interface which shows data further down in a hierarchy that underlies the integrated rating in FIG. 3.

FIG. 6 illustrates a page 600 showing a lower level in the hierarchy which provides the user with data on certain indicators within the category of biodiversity 662, namely the "EN24" family of indicators 664. The EN24 indicators are a subset of indicators derived from the Global Reporting Initiative ("GRI") framework; thus, reference can be had to the GRI framework of indicators; however, a preferred embodiment utilizes a different set of fewer indicators, as described herein. Which particular indicators are included in a category is decided by the rating system provider, but can be edited by the user through My Ratings. Exemplary categories and indicators are listed in the table below. The page 600 provides a letter grade 620, a numerical grade 622, a table 670 comparable to grades 520, 522 and table 570, except of course now relating specifically to the EN24 indicator in this illustrated page. Optionally, the data in the table 670 can be charted. For example, the EN24.1 and EN24.2 values can be charted, as previously described, on separate axes and the overall composite of those parameters can be charted on an additional axis, if desired. However, a visual presentation of multivariate data is perceived as being more helpful to users when the number of parameters is greater, as in FIGS. 3 and 5.

Figure 7:
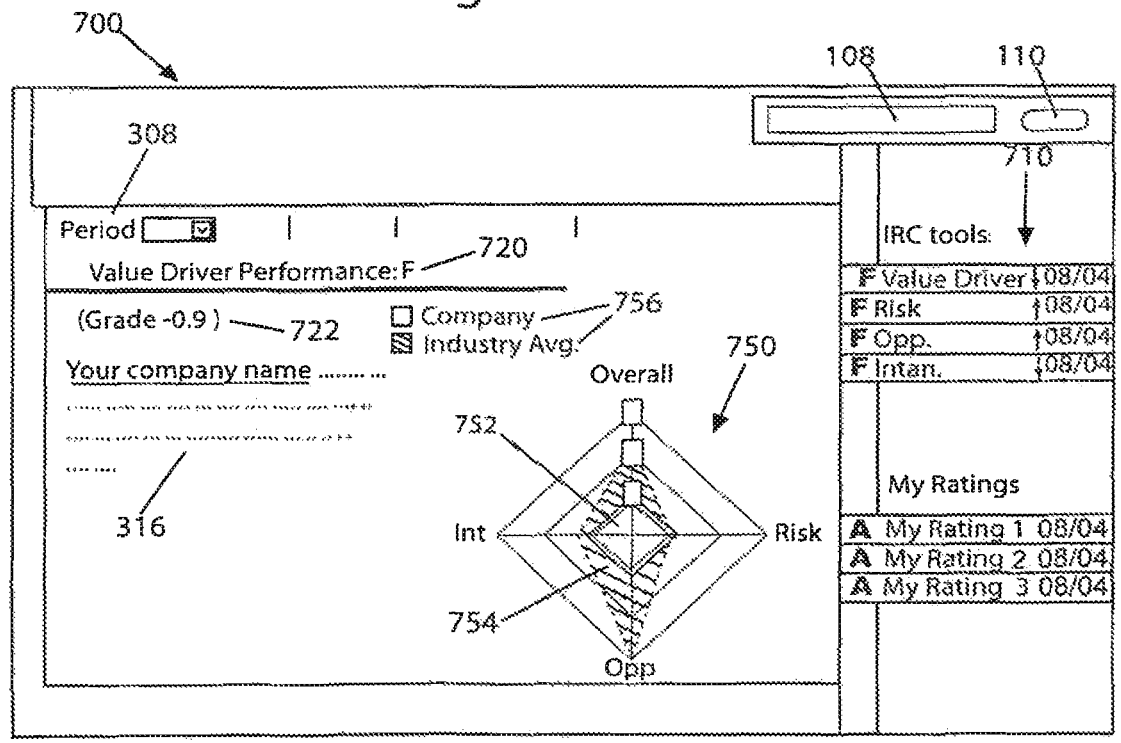
FIG. 7 illustrates a page providing a different perspective on a rated-company than that of FIG. 3 which may be provided in an interface constructed in accordance with an embodiment of the invention.

With reference now to FIG. 7, the performance of a company is expressed from the point of view of what is perceived to drive its value. Three principal value drivers that are believed to be influenced by the information that underlies the integrated rating 320 that a company receives through the rating system are its risks, opportunities and intangibles. In FIG. 7, a page 700 provides one additional or alternative perspective to the integrated rating page 300 discussed above, and can serve as a home page for a given user who prefers this perspective (e.g., the page presented upon selecting the home key from page 100 or upon selecting a search result from table 204). The value drivers are those aspects of EESG information that are material to the performance of companies which are included in the database. Financial analysts, asset managers, issuers, CFOs and others can use the value driver tools which permit selection of parameters as a complementary overlay to existing financial services that they receive. The EESG information of the company relating to risks, opportunities/EPS (earnings per share) and intangibles can reside in several categories, including: reputation risk, product risk, regulation risk, crisis management systems, non-compliance, stakeholder defection, and resource dependency. There are also sector-specific risk categories, sub-groups and user-defined categories that can be utilized to define the parameters that govern the contents of a value-driver report that the user can extract from the rating system. The value drivers can be benchmarked to industry, sector, etc., as described above.

Referring again to FIG. 7, a hierarchical list 710 of the value drivers of risk, opportunity and intangibles permits a user to select a list member and inspect the parameters that result in that member's rating. The Value Driver Performance rating is expressed, as before, both as a letter grade 720 and as a numerical grade 722. The time period under analysis 308 and a general description 316 of the company and its industry are preferably provided on this page, as is a multivariate chart 750 of the three principal variables and their overall rating of the company 752 in coordination with, but distinguished from, the industry average 754 (with a suitable legend 756 identifying what has been charted).

Figure 8:
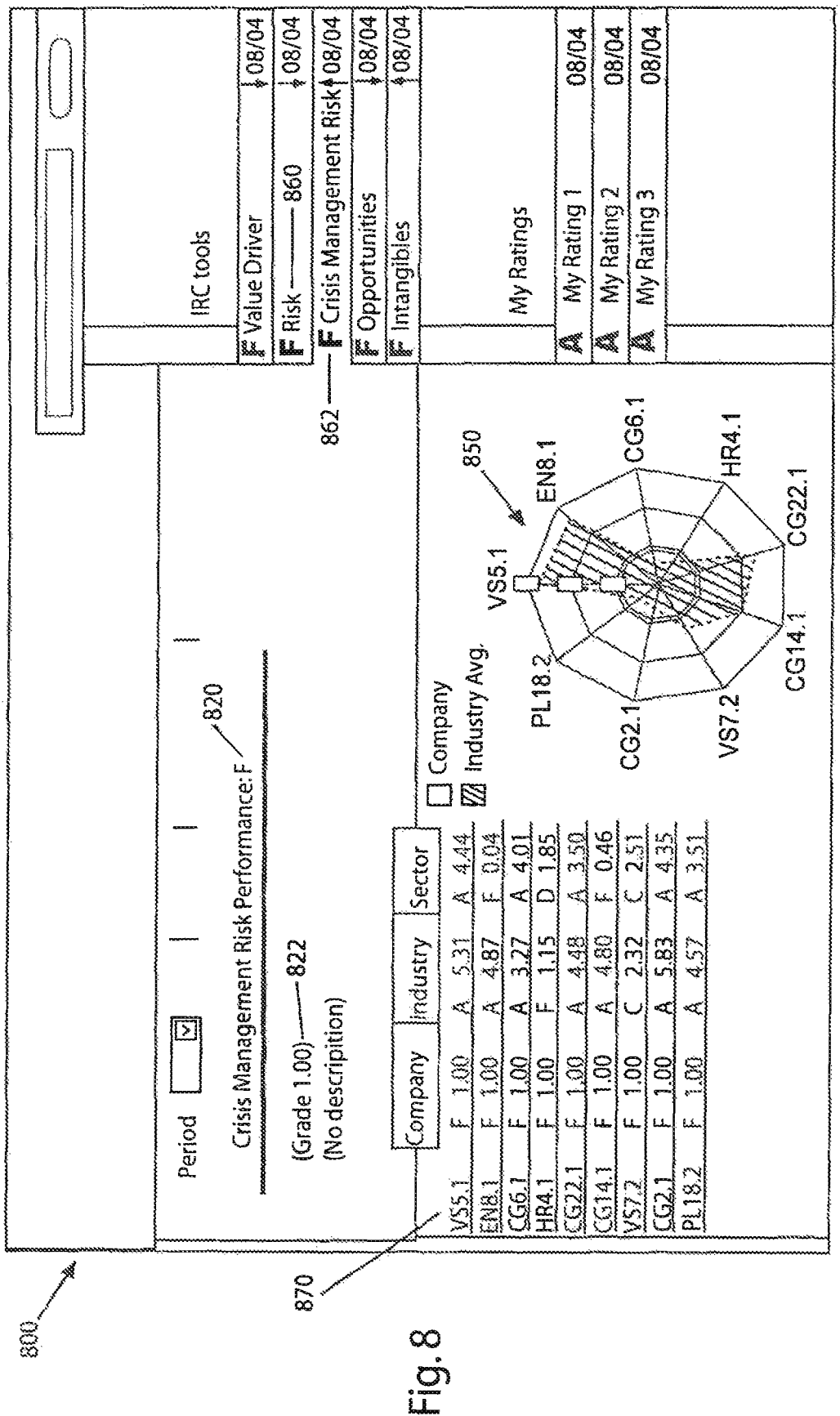
FIG. 8 illustrates an exemplary further page in a user interface which shows data further down in a hierarchy that underlies the rating in FIG. 7.
Figure 9:
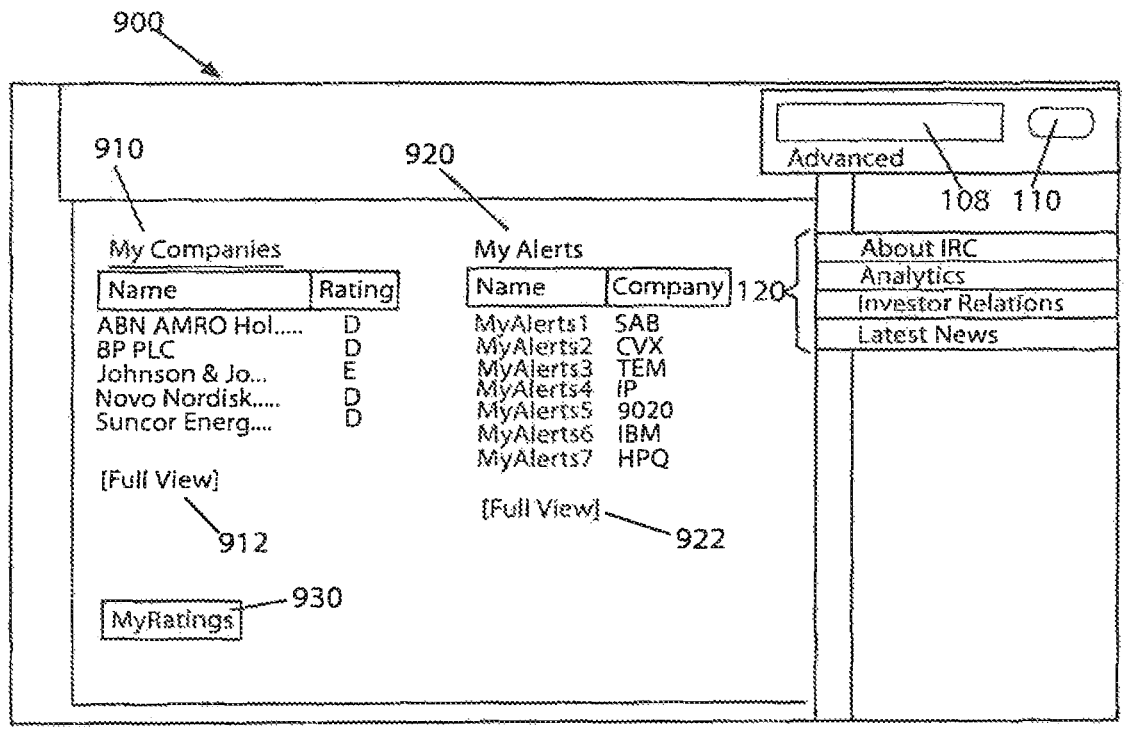
FIG. 9 illustrates a personalized page which may be provided in an interface constructed in accordance with an embodiment of the invention.

In FIG. 8, the parameters that underlie the Risk variable are provided in a page 800. In this page, the Risk variable 860 has been selected (from page 700) and is shown expanded to reveal the Crisis Management Risk category 862 which is computed from nine variables to have a Crisis Management Risk Performance letter grade 820 and a Crisis Management Risk Performance numerical grade 822. A chart 850 has each of these variables as an axis extending from a common origin; however, in contrast to previously described charts, the chart 850 does not include a plot of any statistics apart from the eight variables. A table 870 includes the numeric and letter grades of the company, its industry, and its sector, and the numeric grades provide values for coordinating industry or sector performance with that of the company.

Referring now to FIG. 9, a personalized page which may be provided in an interface constructed in accordance with an embodiment of the invention. The personalized page 900 includes navigation keys 120, search box 108, and further includes three principal features: a My Companies list 910, a My Alerts list 920 and a My Ratings button 930. The My Companies list provides a summary of the integrated ratings for a selected list of companies. A full view button 912 provides further details on the selected companies, for example, in a format similar to that shown in table 204 (FIG. 2). The My Alerts list 920 provides a summary of the user-alerts that have been established for particular companies by the user, and a full view button 922 provides a more detailed view of the general settings of each alert, and can be in the format shown in FIG. 12, for example.

Figure 10:
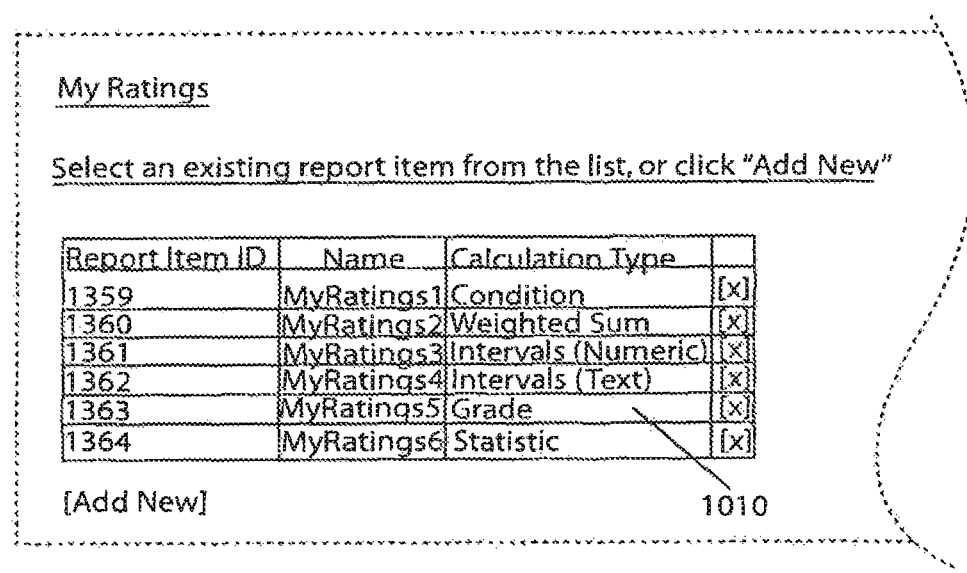
FIG. 10 illustrates a portion of a My Ratings page that permits users to select among existing personalized rating criteria or to create new rating criteria.

The My Ratings button 930 presents a page or frame to the user, as shown in FIG. 10, which allows the user to select from existing personalized ratings criteria or to create new criteria. As described in the aforementioned pending application which has been incorporated by reference, users may wish to define their own ratings criteria to apply to particular companies, industries, or sectors to suit their preferences, beliefs and perspectives. By selecting a report from the report list 1010 in FIG. 10, the user can revise a particular one of his or her My Ratings, and such changes are then available to the user simply by selecting the desired My Rating from table 326 (which appears on a number of pages in the user interface). If one of the My Ratings is selected from the report list 1010, then a web page or frame is presented to the user which is populated with the existing My Rating information for the selected My Rating. The user can then edit that data by changing the existing data in the fields 1110, 1120, 1130 of the data record, or change the formula that governs the rating calculation (see, again, the co-pending application for discussion on formula editing) by clicking on the proceed to formula editor button 1140. Alternatively, the user can delete the data record using the remove button 1150, or cancel the operation using the cancel button 1160.

With reference again to FIG. 9, if a full view of the My Alerts list 920 is selected or if another appropriate button is actuated, the user can be provided with an alert report page or frame with information such as shown in FIG. 12. The alert report page itemizes by alert name the companies that have user-established alerts associated with them, the basis upon which to generate an alert message (e.g., based on ratings change activity in environmental performance, EN24.2, or any other parameter in the ratings system), and the trigger for the alert (any change, only when there has been an upgrade, only when there has been a downgrade). There is also a status 1210 for each company that is in the alert report watch list which can be an animation advising the user whether he or she has an unread alert, and a notes section 1220. Preferably the alert name, company name, report item, alert type, status, and notes are combined into data records that are managed by the ratings system and stored in a database, and, more preferably, a central database.

Figures 13, 16:
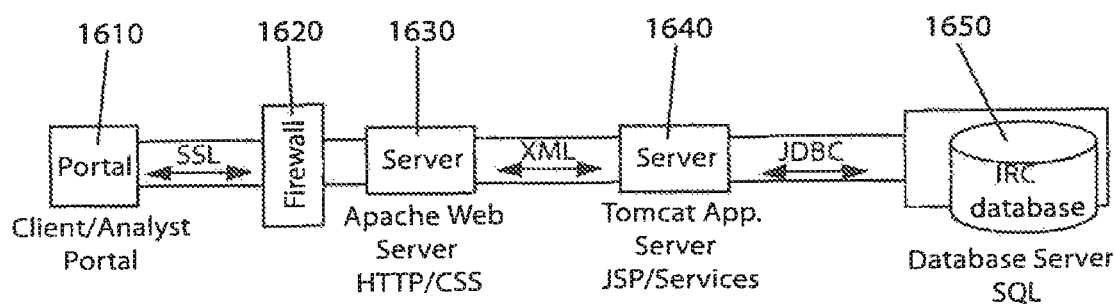
FIG. 13 illustrates details for editing a particular, existing My Alert.
FIG. 16 illustrates a hardware and software arrangement that is useful in implementing an embodiment of the invention.

FIG. 13 shows a checklist that can be completed in order to set parameters for a user-established alert, including how and to where the alerts are to be sent. As show, check boxes permit entry of the trigger type and threshold values that must be satisfied, whether as a grade change (namely, a numerical amount, say, a change from 0.0 to 0.1 or from 0.1 to 0.3) or a rating change (namely, an alphabetical grade change, say, from A downgraded to B or from E upgraded to D), and check and text boxes for selecting the format for the alert and providing a destination address (e.g., an email or phone number).

FIG. 14 shows raw data underlying the integrated rating of a company, which in the illustrated case is "3M." The raw data page identifies for a selected period of time a particular indicator 1410 and an explanation of what it represents, a source 1420 for the value or setting used by the rating system (e.g., a corporate web site), textual data 1430 explaining significance (e.g., whether this indicator bears on one of the value drivers), comments, files, data status and the quality of the information. To the extent that this information can be gathered and reported, it is included in the rating system database and is publicly inspectable at this fundamental level through the raw data page or by exporting to a Microsoft Excel spreadsheet or the like.

Raw data for a company can be established in the rating system database using a raw data tool which provides a structure for the data and content of the information of concern. For example, the information structure can be a data record organized as shown follows:

Number: LA91
Field: Social Performance
Category: Labor practices/decent work
Aspect: Training/Education
Indicator type: Core
Indic. desc.: Average hours of training per year per employee by category of employee
Indic. Name: Average hours of training per year per employee The raw data concerning a particular company (Roche) that comprises the content for such a record might read as follows:

Raw Data: "In 2003, Roche employees spent an average 23 hours on training, which represents more than three days of training . . . ."
Source: Sustainability Report 2003
Page: 37
Publisher: Company
Author: not relevant
Date: 2004
Scope of Relevance: Worldwide
Quality of info: Reliable As can be appreciated from the table below, on the order of about 250 to about 300 indicators are preferably used in the determination of an integrated rating using the four pillars EESG. The indicator data consists of raw and quantified data. Raw data consists of textual information about the indicators such as shown in the above excerpted statement in the example of a Roche accounting report. Quantified data comprise numeric or yes/no values, which can be manually derived from the raw data or from its status if the data is incomplete. In the case of yes/no indicators, a rating can have a predefined value or a calculated value from related indicators. For example, one indicator question might be "Does the company publish information about $CO_2$ emission?," and if the answer to this is "yes" some other indicators about $CO_2$ will count in the rating; otherwise, the rating is accorded the predefined value.

Figure 15:
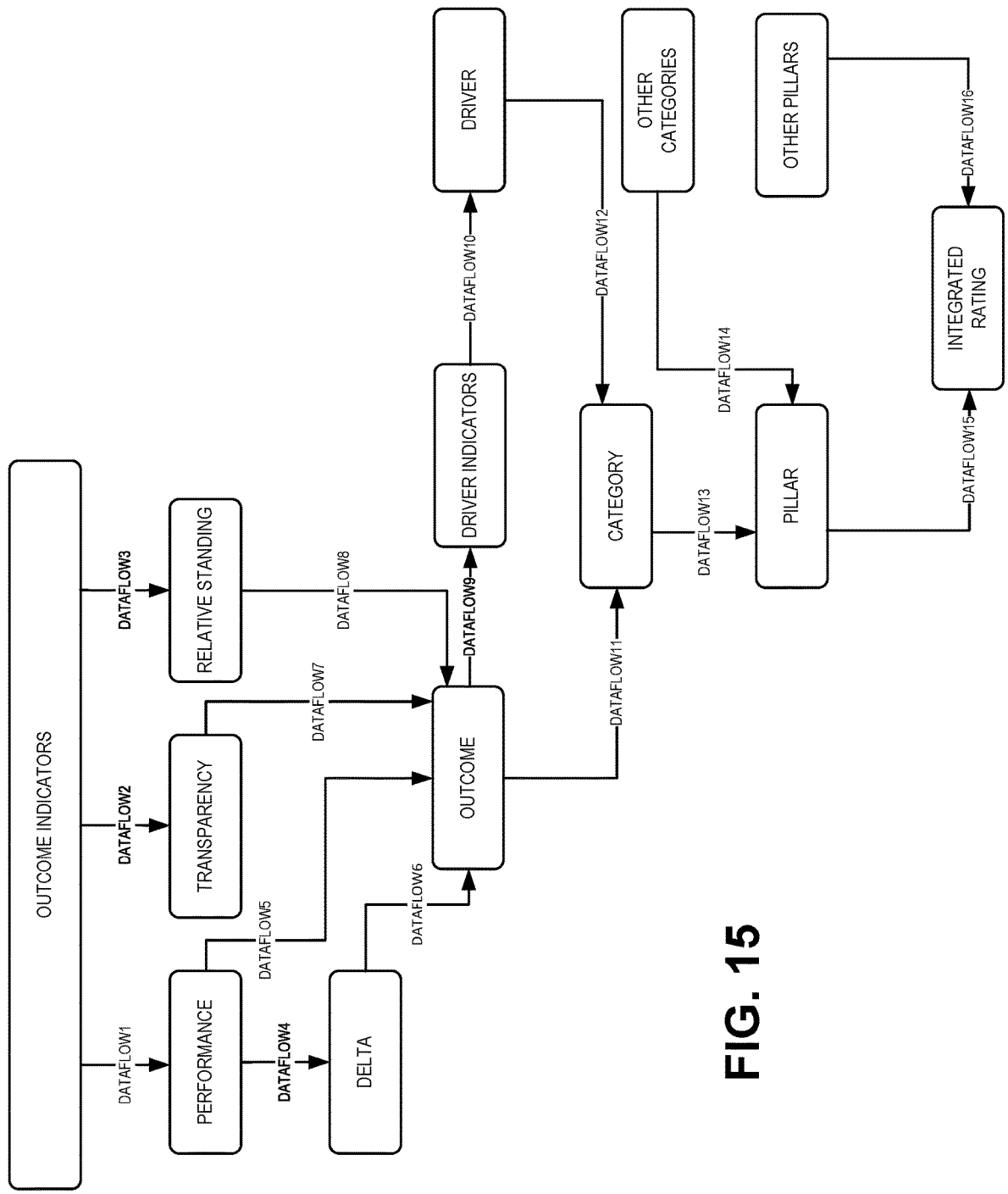
FIG. 15 illustrates a hierarchy of variables and their organization in accordance with a preferred embodiment of the invention.

FIG. 15 shows a hierarchical relationship among the parameters that are combined into an integrated rating. At the top of the hierarchy is the integrated rating 320, 322. The integrated rating is calculated using a formula provided by the rating system, as may be optionally modified by the user. The four pillars provide the principal variable values which are combined by the formula into the integrated rating. For simplicity, FIG. 15 shows one of the pillars. Each pillar receives parameters from one or more categories, though only one category is shown, again for simplicity. In the preferred embodiment, there are four pillars and eighteen categories, under each of which are prescribed indicators, as shown in the table below.

The categories, in turn, are an amalgam of variables, some of which are "outcome" parameters which have values associated with them, and others are "driver" parameters which have a yes/no state setting associated with them. Outcome and driver parameters receive their values from indicators. Driver indicators (always yes/no) are about the policies, management systems and tools employed by the company's management with the intent to improve an issue (which is codified in the rating system as a "category"). Driver indicators measure the company's real intentions and commitments. Outcome indicators (Value or yes/no) measure if the company has successfully achieved an improvement on a particular issue. Outcome indicators measure observable results which provide indications on the company's standing in respect to a specific issue (again, which is included as a "category" in the rating system). The rating system uses a set of indicators to arrive at the integrated ratings described herein. The type of indicators that have been selected for use in a preferred embodiment of the present rating system are described within their respective categories as follows:

| Pillar | Category | Type of indicators |
|---|---|---|
| Economic | Revenues/Client Loyalty | Indicators show: the commitment towards growth while maintaining a loyal client base; Existence of a customer loyalty or fidelity program with customer satisfaction programs (Preventing anti-competitive behavior, trust and monopoly, price-fixing). |
| | Margins/Performance | Indicators show: the general commitment towards low and stable cost base; Existence of an employee loyalty or supplier loyalty program to avoid fluctuations with satisfaction programs (Commitment towards production process innovations, simplified structure, tight controls, overhead minimization or new sourcing opportunities). |
| | Profitability/Shareholders Loyalty | Indicators show: Commitment towards transparency and shareholder loyalty (keeping long-term shareholders with a focused and transparent long-term strategy); Focus on providing shareholders with a high return on investments and a solid balance sheet with a conservative accounting policy. |
| Environmental | Resource Reduction | Indicators show: Commitment towards efficient use of natural resources in the production process; reduction in the use of materials, energy or water; Finding more efficient environmental solutions by integrating suppliers (supply chain management). |

-continued

| Pillar | Category | Type of indicators |
|---|---|---|
| | Emission Reduction | Indicators show General commitment towards environmental emission and impact reduction in the production process; reduction in environmental emissions (Greenhouse Gases, F-Gases, Ozone-Depleting Substances, NOx and SOx, other significant air emissions, waste, hazardous waste, water discharges or spills); impact on biodiversity; Partnering with NGO's, Industry organizations or Supra-governmental organizations for environmental improvement or community goodwill. |
| | Product Innovation | Indicators show: general commitment towards environmental products/services innovation; environmental efficient Products (eco-design, life cycle assessment-LCA, dematerialization, extended durability, emission reduction by product use, etc). |
| Social | Workforce/ Employment Conditions | Indicators show: general commitment towards employment and job conditions: employment benefits (salary, profit sharing, pension plan, health care, other insurances and other benefits); commitment to long term employment security (Net employment creation, avoidance of lay-offs, turnover limitation, promotion from within, maintenance of general relations with trade unions, etc.) |
| | Workforce/ Health & Safety | Indicators show: general commitment towards job health & safety: Health & Safety in the broad sense, encompassing physical and mental health, stress and well being of all employees; Compliance to the ILO Code of Practice on Recording and Notification of Occupational Accidents and Diseases or the ILO Guidelines for Occupational Health Management Systems; Quality management systems like OHSAS 18001 (Occupational Health & Safety Management System) |
| | Workforce/ Training and Development | Indicators show: general commitment towards training and development (education); developing skills and competencies (occupational, human or social relations and communication), encompassing programs to support the career development and continued employability of employees and to manage career endings. |
| | Workforce/ Diversity and Opportunity | Indicators show: general commitment towards diversity and opportunity: promoting an effective balance between personal (family-friendly policies, vacations, part-time, flex-time, career breaks, maternity leave, sabbatical etc.) and professional development (career planning); promotion of diversity and opportunity (equal treatment between women and men) and tackling other forms of discrimination or harassment as in the case of unfair treatment of people with disabilities, or because of age, ethnicity, 'race', nationality, religion, or sexual orientation. |
| | Society/ Human Rights | Indicators show: general commitment towards the Fundamental Human Rights convention of the ILO relevant to operations (workforce, suppliers, supply chain management and contractors) or SA8000 (standard and verification system for humane workplaces); Freedom of association universally applied independent of local laws; Exclusion of child, forced or compulsory labor. |
| | Society/ Community | Indicators show: general commitment towards maintaining the company's reputation within the general community (local, global and state) through transparent communication; intention to be a good citizen in the community, through protection of public health (Non-Ionizing Radiation Protection), donations or staff time, accurate advertising, open attitude and dialogue with stakeholders or addressing the needs of indigenous people; intention to respect business ethics (business partners) by avoiding bribery and corruption, setting guidelines on political contributions and lobbying, paying fair taxes or preventing anti-competitive behavior (anti-trust and monopoly). |
| | Customer/ Product Responsibility | Indicators show: general commitment towards improving the customer's health, safety and social situation; focus on quality, customer health & safety and security; preservation of customer integrity and privacy (data security, confidentiality) with accurate product information, labeling and marketing policy or commitment towards new markets developments (providing the developing world "bottom of the pyramid" with access to the company's products and services) |
| Corporate Governance | Board of Directors/ Board | Indicators show: general commitment towards corporate governance principles related to the Board members; focus on a well-balanced membership of the Board of |

| Pillar | Category | Type of indicators |
|---|---|---|
| | Structure | Directors/Supervisory Board (size, skills, background, experience, age, diversity, availability, independence); Able to ensure an independent decision-making process in a critical exchange of ideas with the Executive Management. |
| | Board of Directors/ Compensation Policy | Indicators show: general commitment towards attracting and retaining Executives and Board members with the necessary skills through attractive compensations; Remuneration policy which links compensation to individual or company-wide financial or extra-financial targets; Provision of termination by early termination. |
| | Board of Directors/ Board Functions | Indicators show: general commitment towards corporate governance principles related to the Board activities and functions: Board Committees, Board effectiveness, Board meeting attendance, internal organizational structure with allocation of tasks and definition of areas of responsibility. |
| | Shareholders/ Shareholders Rights | Indicators show: general commitment towards a shareholders policy: shareholders rights, equal treatment of shareholders (minority), anti-takeover devices |
| | Integration/ Vision and Strategy | Indicators show: general commitment towards an integrated and global view (sustainable development): presentation of an overall or overarching vision and strategy integrating the economic (financial), social and environmental aspects; focus on transparency and communication on all extra-financial issues. |

The indicators noted above, once a set has been selected for a given rating system, can be accorded a naming convention for access, updates and other manipulation by the software of the rating system. For example:

pp_[xx_yy]_{D/O}#, in which pp is the pillar short abbreivation (So=Social, En=Envorinmental, Ec=Economic, CG=Corporate Governance), next is the top-category name (2 letters) followed by the category (again 2 letters) and finally a "D" for driver or "O" for outcome followed by a number. For example, the category can be characterized as Workforce/Health & Safety (xx="WO", yy="HS"). This can be the default tree structure for the data records from which all indicators can be accessed. Each category starts off with the same 4 driver-indicators: Policy, Implementation, Monitoring, Improvements): The rest of the indicators in a category are outcome indicators and can be yes/no questions or double questions or amounts, ratios, etc. An outcome indicator's value can be Not Available ("NA") or Not Relevant ("NR"). NA means that there is no answer to the value for the question. NR means there is a value but it is not relevant (e.g. CO2 emission by a banking entity which is not particularly relevant since this is not a manufacturing entity, but still is reported by some banking entities). In the case of outcomes, the rating system calculates the performance, the transparency, the changes over time ("delta"), and the exposure due to particularly lagging performances ("relative standing") of the data in the indicator.

The underlying data that is sought from a company to populate a given indicator will either be relevant or not relevant. If relevant, the question remains whether there is information or not to populate that indicator. If there is relevant information, then the performance value will go up or down depending on the data itself, and the transparency value will go up because there is public reporting of a relevant datum. If the relevant information is not available, there is no change to the performance value as there is no data upon which to base a change, but the transparency value will go down because there is no public reporting of a relevant datum. On the other hand, even if the information is not relevant, the content of the data itself can impact the performance value, and the transparency value goes up because the data, though not relevant to this company or sector or industry, is reported. If the information is not relevant and not available, there is no impact on the values of performance or transparency. The outcome calculation can include the delta and relative standing parameters or these can be calculated separately. "Delta" is the measurement of changes (improvements or deterioration) of the performance of that indicator over time. If a company has increased its performance over the past year then it gets a bonus in terms of an improved score for doing so. Conversely the company is penalized if its performance has deteriorated. Finally, the "relative standing" component of the algorithm preferably operates to penalize companies that show particularly bad performance in individual indicators as compared to a benchmark. Therefore, the high exposure that a company can face due to having the worst performance in individual indicators is also taken in account in the outcome grade of a category because if a company is in, say, the lowest 1-5% quartile for a certain indicator, that is indicative of potentially higher risk exposure.

FIG. 16 shows a hardware and software arrangement that can be used to implement a hosted rating system as described herein. One or more users can access the rating system through a portal 1610 which preferably includes the interface pages described above and is therefore web-browser compliant, and, more preferably, compatible with Microsoft's Internet Explorer 6.0, and the Firefox LINUX Web browser. Communications proceed through a secure socket connection from remotely distributed client machines at the portal through a firewall 1620 to a Web server 1630. The web server communicates with an application server 1640 (e.g., a Tomcat server that supports JSP/Services) through standard protocols, and preferably exchanging rich text using XML structures. In turn, the server 1640 communicates with a central database 1650, e.g., a Sequel database, through JDBC.

In operation, users access the portal 1610 through a standard client machine such as a personal computer, personal digital assistant, or other device compliant with the web server 1630. User authentication and validation services take place after which the user is permitted to inspect data underlying ratings for one or more companies, create use and store alerts and rating criteria and export data to their local machine. For visiting, non-registered users, only top-level integrated ratings may be presentable to the user, if even that. At the back end, requests received through the portal are transferred over to the server 1640 at which calculations of ratings are performed for the requested/prevailing time period, for the company or companies that are in the scope of the user's request (e.g., the companies in any search results or the companies in a My Companies list). In the event that the user has selected My Ratings criteria, the server 1640 retrieves stored criteria from the database 1650 and applies that criteria to stored data for the company or companies that are in the scope of the user's request. The server 1640 also manages any other personalization (including any alerts) that the user may have set, so that messages can be sent (or be attempted to be sent) to the user regardless of whether the user is presently logged onto the rating system.

In certain implementations, the charts and rating calculations can be performed at the client machine through an Applet, ActiveX component, or by executing a stand-alone application or XML within the client's local machine environment. In other implementations, these activities are performed by the server 1640 and forwarded through the web server 1630 to the client machine for presentation through the user interface.

Optionally, a "My Key Numbers" button or selection list can be included on one or more pages of the interface. For example, "My key numbers" can be a pull-down list provided on the home rating page of each company accessed by the user. The user can define certain indicators, categories, or ratings for inclusion in this list or for that particular company. Thus, the user could select CO2 emissions, the Social pillar, and the category "human rights" for GM Corporation while the same or different selections can be stored as the key numbers for other companies.

Preferably, all textual data is stored in Unicode, a text format that provides a unique number for every character across platforms, programs and languages. Preferably, all time data is stored in the UTC time format, all pixel-based graphical data is stored in PNG, and all image (photographic) data is stored in JPEG. Preferably, all data creation, modification and deletion in the system is logged with timestamp, user, original data, etc. to enable tracking of any activity in the rating system. This information can also be used for user-access control and billing.

The rating system can provide reports to the user which concern a single company or a group of companies—e.g., within an industry, country, etc. The time frame for a given report can be for a current year or other time windows of longer scope depending on values entered into the period box 306. Reports and charts can be exported for use in other applications such as Microsoft Excel or Adobe Acrobat (i.e., in pdf format). Depending on the permission level accorded to a given user, the report can include either detailed or summary information, archival data including historical ratings, and possibly also some or all of the raw data. From the foregoing, it should be understood that all or part of the database 1650 can be exported, including raw and quantified data and calculated values.

While the invention has been described in connection with a certain embodiment thereof, the invention is not limited to the described embodiments but rather is more broadly defined by the recitations in the claims below and equivalents thereof.

What is claimed:

1. A computer-implemented method for constructing a multivariate presentation of variables concerning a rating of a company, each variable having a unique set of underlying indicators, comprising:

computing, within at least one processor of an at least one computer in a distributed computer network, a numeric grade for each variable of the variables calculated on a scale that starts at zero by applying a formula that weighs a first value assigned to each indicator of the underlying indicators associated with each variable;

computing, within the at least one processor of the at least one computer, an overall numeric grade from the numeric grade computed for each variable, wherein the overall numeric grade represents an overall rating of the company based on the numeric grade computed for each variable;

defining, on a display screen of the at least one computer an origin;

extending, from the origin, a first plurality of axes on the display screen, wherein the first plurality of axes comprising at least a first axis, a second axis, and a third axis, the first plurality of axes being generally equidistant from each other, a first axis of the first plurality of axes representing the overall numeric grade and second and third axes of the first plurality of axes representing a respective one of each of the variables;

plotting, on the display screen, the numeric grade of each of the variables and the overall numeric grade as a first point on a respective axis corresponding to the variable, thereby displaying first plotted points;

using the first plotted points to interpolate first linear segments between the first plotted points on each of the axes of the first plurality of axes to form a first polygon representative of a performance of the company;

plotting, on the display screen, benchmarking information corresponding to each of the variables as a second point on each axis of the first plurality of axes, thereby displaying second plotted points, wherein the benchmarking information is obtained from a database; and using the second plotted points to interpolate second linear segments between the second plotted points on each of the axes of the first plurality of axes to form a second polygon indicative of a comparison between the performance of the company and the benchmarking information.

2. The method of claim 1, the computer-implemented method further comprising:

in response to selection, by a user, of a variable of the variables:

extending from the origin at least a second plurality of axes on the display screen, the second plurality of axes being generally equidistant from each other, a fifth axis of the second plurality of axes representing the selected variable and remaining axes of the second plurality of axes representing the underlying indicators underlying the selected variable;

plotting on the display screen a third value of the selected variable and a fourth value of the underlying indicators underlying the selected variable as a third point on each axis of the second plurality of axes; and using third plotted points to interpolate third segments between the third points plotted on the axes of the second plurality of axes on the display screen, wherein the interpolated third segments are disposed about the origin in generally surrounding relation to the origin, wherein a plurality of the third segments are interpolated between the third plotted points.

3. The method of claim 1, wherein the underlying indicators comprise a first portion relating to financial data of the company and a second portion relating to non-financial data of the company, and wherein at least one indicator of the underlying indicators includes a state setting, the method further comprising:

providing to a client machine connected to the distributed computer network an interface for presentation of the computed overall rating of the company as a numeric or alphanumeric value.

4. The computer-implemented method of claim 1, the method further comprising:

interpolating, by the at least one processor of the at least one computer, the first plotted points and the second plotted points, respectively.

5. The computer-implemented method of claim 4, wherein the interpolating the first plotted points and the second plotted points comprises interconnecting each of the first plotted points to one another and each of the second plotted points to one another to render, respectively, the first polygon and the second polygon.

6. The computer-implemented method of claim 1, wherein a number of axes comprising the first plurality of axes corresponds to a number of variables being plotted.

7. The computer-implemented method of claim 1, wherein a third value of each variable comprises a calculation based upon two or more of the underlying indicators associated with the company.

8. A system configured to construct and present a multivariate presentation of variables concerning a rating of a company, each variable having a unique set of underlying indicators, comprising:

one or more processing devices configured to:
compute, within at least one processor of an at least one computer in a distributed computer network, a numeric grade for each variable of the variables calculated on a scale that starts at zero by applying a formula that weighs a first value assigned to each indicator of the underlying indicators associated with each variable;
compute, within the at least one processor of the at least one computer, an overall numeric grade from the numeric grade computed for each variable, wherein the overall numeric grade represents an overall rating of the company based on numeric grade computed for each variable;
define on a display screen of the at least one computer;
extend, from an origin, a first plurality of axes on the display screen, wherein the first plurality of axes comprises at least a first axis, a second axis, and a third axis, the first plurality of axes being generally equidistant from each other, a first axis of the first plurality of axes representing the overall numeric grade and second and third axes of the first plurality of axes representing a respective one of each of the variables;
plot, on the display screen, the numeric grade of each of the variables and the overall numeric grade as a first point on a respective axis corresponding to the variable, thereby displaying first plotted points;
use the first plotted points to interpolate first linear segments between the first plotted points on each of the axes of the first plurality of axes to form a first polygon representative of a performance of the company;
plotting, on the display screen, benchmarking information corresponding to each of the variables as a second point on each axis of the first plurality of axes, thereby displaying second plotted points, wherein the benchmarking information is obtained from a database; and
using the second plotted points to interpolate second linear segments between the second plotted points on each of the axes of the first plurality of axes to form a second polygon indicative of a comparison between the performance of the company and the benchmarking information.

9. The system of claim 8, wherein the one or more processing devices are further configured such that, in response to a user selection of a variable of the variables, the at least one processor is further configured to:

extend from the origin a second plurality of axes on the display screen, the second plurality of axes being generally equidistant from each other, a fifth axis of the second plurality of axes representing the selected variable and remaining axes of the second plurality of axes representing the underlying indicators underlying the selected variable;
plot on the display screen a third value of the selected variable and a fourth value of the underlying indicators underlying the selected variable as a third point on each axis of the second plurality of axes; and
use third plotted points to interpolate third segments between the third points plotted on the axes of the second plurality of axes on the display screen, wherein the interpolated third segments are disposed about the origin in generally surrounding relation to the origin, wherein a plurality of the third segments are interpolated between the third plotted points.

10. The system of claim 8, wherein the one or more processing devices are further configured to provide to a client machine connected to the distributed computer network an interface for presentation of the computed overall rating of the company as a numeric or alphanumeric value.

11. The system of claim 8, wherein the one or more processing devices is further configured to interpolate the first plotted points and the second plotted points.

12. The system of claim 11, wherein the one or more processing devices configured to interpolate the first plotted points and the second plotted points further comprises the one or more processing devices further configured to interconnect each of the first plotted points to one another and each of the second plotted points to one another to render, respectively, the first polygon and the second polygon.

13. The system of claim 8, wherein the first plurality of axes corresponds to a number of variables being plotted.

14. The system of claim 8, wherein a third value of each variable comprises a calculation based upon two or more of the underlying indicators associated with the company.

\* \* \* \* \*